Patented Mar. 15, 1938

2,111,194

UNITED STATES PATENT OFFICE 2,111,194

METHOD OF PRODUCING HYPOCHLOROUS ACID SOLUTION

Pedro Sanchez, Habana, Cuba

No Drawing. Application January 12, 1934
Serial No. 706,443

3 Claims. (Cl. 23—152)

The object of the invention is to provide an improved chemical compound, and also various methods of producing the same.

Heretofore, and up to the present time, efforts have been made to use hypochlorous acid commercially, due to its excellent bleaching properties, but the use of this acid has never been commercially feasible, due to its extreme unstability.

An object of the invention, therefore, is to provide a combination of chemicals, either in water for the bleaching of various materials or substances, which can be satisfactorily placed therein or added thereto, or directly in a liquid, which it is desired to decolorize, such for instance as sugar solutions, oil, etc.

A solution of this improved chemical compound it has been found can be made and held indefinitely, without giving off or releasing the bleaching agent, until such time as a material or substance to be bleached is added to such solution. Only at that time is a sufficient quantity of the bleaching agent released, to effect the bleaching of the said material or substance, after which there is a cessation of the release of the bleaching agent, until still further material or substance is added to the solution for bleaching.

Furthermore, the process of producing the improved chemical compound comprises the combination in any aqueous solution of any alkali and any acid, which when combined make a precipitate which is substantially not soluble in the aqueous solution, and while the precipitate is in suspension injecting chlorine into the solution, until the required quantity of chlorine has been absorbed thereby, after which the precipitate is permitted to settle, or is filtered therefrom, and the clear chlorinated liquid is drawn off, containing the stable hypochlorous acid in solution.

In this process of producing the said chemical compound, the exact nature of the chemical action may not be fully known or appreciated at the present time. If the chlorine is injected into the aqueous solution, without the precipitate being in suspension, said solution will not take up the chlorine, which will merely bubble thru and pass off from the liquid.

On the other hand, when the chlorine is injected into the solution in the presence of the precipitate, and especially when the precipitate is in suspension, the chlorine is readily taken up in some manner by this liquid, and held there in a stable condition, without entering or being permanently retained by the precipitate, as evidenced by the fact that the precipitate remaining after withdrawing the clear liquid therefrom contains practically no chlorine. In other words, it is thought that the precipitate serves or acts in the capacity of a catalyst, which under these conditions it probably is.

Particularly in view of the facts herein brought out, it is to be understood that both said chemical compound and its processes of production must not be restricted within the full scope of the appended claims, nor is the compound resulting from such processes to be limited to the use of any one or more specific acids.

Nor is the process, involving the injection of chlorine into an aqueous solution containing a precipitate, to be limited to any specific alkali and acid, because any alkali that combines with any acid to produce a precipitate substantially insoluble in an aqueous solution, will produce the same result.

Among the acids known at this time to give more or less satisfactory results are oxalic, citric, sulphuric and phosphoric, while very probably additional bases, other than lime, may be used to form with any one of said acids resulting precipitates, which are substantially not soluble in aqueous solutions, and which enable the formation of the improved stable form of hypochlorous acid.

The advantage of this compound lies in the fact that it is the only known powerful oxidizing agent that functions in an acid condition, and therefore as no caustic alkali is present during the oxidizing or bleaching treatment of whatever material is placed therein, such material does not suffer in any way, nor is it adversely affected as it would be by the generally known oxidizing agents, which function in an alkaline condition.

Having thus described my invention what I claim as new and desire to secure by Letters Patent, is:—

1. The process of producing stable hypochlorous acid, which consists in the combination in any aqueous solution of lime and an acid, in quantity sufficient to produce a precipitate which is substantially not soluble in the aqueous solution, and while the precipitate is in suspension injecting chlorine into the solution, until the required quantity of chlorine has been absorbed thereby, after which the precipitate is permitted to settle, and the clear chlorinated liquid is filtered or drawn off, containing the stable hypochlorous acid in solution.

2. The process of producing stable hypochlorous acid, which consists in the combination in any aqueous solution of lime and phosphoric acid, in quantity sufficient to produce a precipitate which is substantially not soluble in the aqueous solution, and while the precipitate is in suspension injecting chlorine into the solution, until the required quantity of chlorine has been absorbed thereby, after which the precipitate is permitted to settle, and the clear chlorinated liquid is filtered or drawn off, containing the stable hypochlorous acid in solution.

3. The process of producing stable hypochlorous acid which comprises combining in an aqueous solution phosphoric acid and calcium oxide in quantity to produce a precipitation which is substantially not soluble in the aqueous solution and while the precipitate is in suspension, injecting chlorine into the solution until the required quantity of chlorine has been absorbed thereby.

PEDRO SANCHEZ.